United States Patent [19]
Ueta et al.

[11] Patent Number: 5,280,928
[45] Date of Patent: Jan. 25, 1994

[54] METALLIC GASKET

[75] Inventors: Kosaku Ueta; Ikkoh Ueta, both of Kumagaya, Japan

[73] Assignee: Nihon Metal Gasket Co., Ltd., Kumagaya, Japan

[21] Appl. No.: 666,947

[22] Filed: Mar. 11, 1991

[30] Foreign Application Priority Data

May 28, 1990 [JP] Japan ................... 2-138006
Jul. 5, 1990 [JP] Japan ................... 2-178423

[51] Int. Cl.$^5$ ............................... F16J 15/08
[52] U.S. Cl. ....................... 277/235 B; 277/180
[58] Field of Search ............ 277/234, 235 B, 236, 277/180

[56] References Cited

U.S. PATENT DOCUMENTS

| | | |
|---|---|---|
| 2,197,916 | 4/1940 | Balfe . |
| 3,668,036 | 6/1972 | Farnam . |
| 4,290,616 | 9/1981 | Nicholson ............... 277/235 B |
| 4,428,593 | 1/1984 | Pearlstein .............. 277/235 B |
| 4,721,315 | 1/1988 | Ueta ..................... 277/236 X |
| 4,728,110 | 3/1988 | Nekasone . |
| 4,759,585 | 7/1988 | Udagawa ................ 277/233 B |
| 4,810,591 | 3/1989 | Sakai . |
| 4,836,562 | 6/1989 | Yoshino ................. 277/235 B |
| 4,861,046 | 8/1989 | Udagawa ................ 277/235 B |
| 4,867,462 | 9/1989 | Udagawa ................ 277/235 B |
| 4,898,396 | 2/1990 | Udagawa ................ 227/235 B |
| 4,998,741 | 3/1991 | Udagawa ................ 277/235 B |

FOREIGN PATENT DOCUMENTS

| | | | |
|---|---|---|---|
| 230804 | 8/1987 | European Pat. Off. | ........ 277/235 B |
| 61-103668 | 7/1986 | Japan . | |
| 255250 | 11/1986 | Japan | ........ 277/235 B |
| 62-261761 | 11/1987 | Japan . | |
| 63-293363 | 11/1988 | Japan . | |
| 35057 | 2/1989 | Japan | ........ 277/235 B |
| 1-104953 | 4/1989 | Japan . | |
| 1-285645 | 11/1989 | Japan . | |
| 64778 | 2/1992 | Japan | ........ 277/235 B |

OTHER PUBLICATIONS

"Metal Handbook", 1948 Edition, ASM, pp. 841, 902, 925–926.

*Primary Examiner*—William A. Cuchlinski, Jr.
*Assistant Examiner*—Scott W. Cummings
*Attorney, Agent, or Firm*—Varndell Legal Group

[57] ABSTRACT

A metallic gasket according to the present invention includes two base plates made of an elastic material. One base plate is provided with an array of beads in association with an odd-numbered combustion chamber bore, only one end segments of which are provided with stoppers, while the other base plate is provided with an array of beads in association with an even-numbered combustion chamber bore, only one end segments of which are provided with stoppers. The base plates are then antisymmetrically laminated together.

11 Claims, 3 Drawing Sheets

METALLIC GASKET

BACKGROUND OF THE INVENTION

The present invention relates to a metallic gasket designed to be interposed between the joining surfaces of a cylinder head and a cylinder block which form part of an internal combustion engine, thereby preventing leakages of combustion gas, cooling water, lubricating oil, etc.

DESCRIPTION OF THE PRIOR ART

Between the joining surfaces of a cylinder block and a cylinder head forming part of an internal combustion engine there is interposed a gasket to impart a sealing function thereto. Of particular importance is a seal to be provided around a combustion chamber. A failure in providing sufficient sealing to the combustion chamber would cause a leakage of the combustion gas from within, resulting in a pressure drop.

According to one approach for solving this problem, an array of beads are located concentrically with a combustion chamber bore formed in an elastic base plate of a metallic gasket. As the metallic gasket is clamped in place by means of bolts, the beads produce repulsive force, which is in turn used to provide a sealing function to the peripheral edge of the combustion chamber. In order to prevent the breaking-down of the beads by fatigue in this case, for instance, stoppers are located on flat segments of the metallic gasket between the combustion chamber bore and the beads, thereby limiting the amplitude of the beads.

In recent years, however, higher-performance and weight-saving engine of smaller size and larger displacement have been in great demand, resulting in a drop of their rigidity. Beads themselves, on the other hand, are more likely to break down by fatigue, since their inter-bolt amplitude of vibration cannot be limited without recourse to stoppers.

This problem may possibly be solved by measuring gaps occurring at the time when a metallic gasket is mounted and clamped in place and providing stoppers of a size corresponding to such gaps.

FIG. 11 is a schematic view, partly cut-away and sectioned, of one typical example of conventional metallic gaskets.

Referring to FIG. 11, reference numerals 10-1 and 10-2 stand for base plates made of an elastic material and 12 an auxiliary plate. The base plates with the auxiliary plate located between them are provided with angular or arched beads 4-1 and 4-2 in the same direction.

The auxiliary plate 12 is provided with a stopper 11 at its one end in association with a combustion chamber bore to limit the amplitude of the beads by vibration.

According to the above arrangement, it would be required to increase the bores of cylinders for the purpose of obtaining a further increase in displacement.

However, if the bores of cylinders are increased in a given space, then it is required to arrange them more closely, resulting in a reduction of the inter-cylinder spaces; where arched beads are used, it is impossible to obtain stopper locations of sufficient width. In this case, it may be envisaged to reduce the width of the arched beads, but some limitation is placed upon the bead width. For instance, when the stopper is 1.5 mm or below in width, a pressure produced by bolting is received at an area so narrow that a very high pressure is applied to the stopper. In addition to such a high pressure produced by bolting, the amplitude of vibration by the operation of an engine is applied to the stopper in the form of waves. Consequently, the sealing surface for the engine deforms, making sealing gradually incomplete.

SUMMARY OF THE INVENTION

In view of the foregoing, the present invention seeks to provide a metallic gasket which is applicable to a closely cylindered engine, while making use of an arched bead to stopper arrangement.

Detailed Description of the Embodiments

The present invention will now be explained more specifically but not exclusively with reference to the accompanying drawings.

Figure 1A:
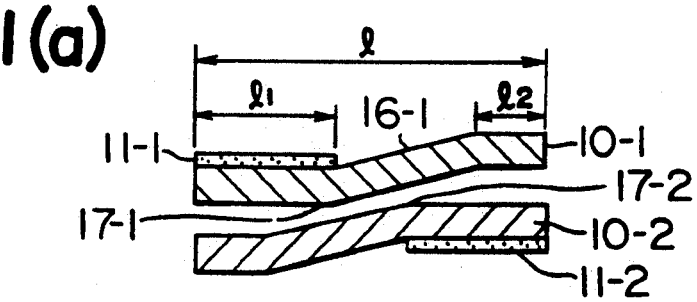
FIGS. 1(a)–1(c) are schematic views of one embodiment of the metallic gasket according to this invention, FIG. 1(a) being a sectional view taken along the line 1—1' in FIG. 2 to be referred to just below, FIG. 1(b) a sectional view taken along the line 2—2' and FIG. 1(c) a sectional view taken along the line 3—3'.
Figure 1B:
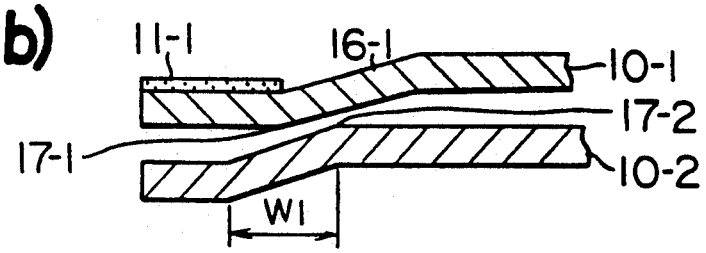
Figure 1C:
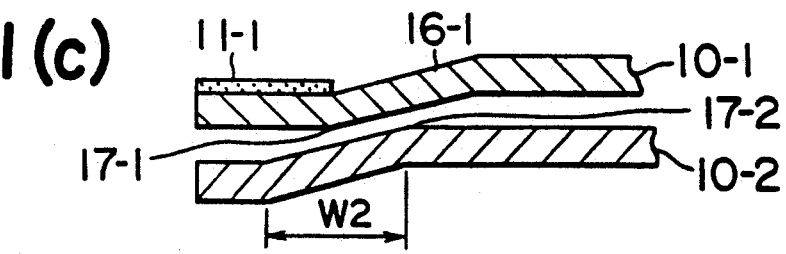
Figure 2:
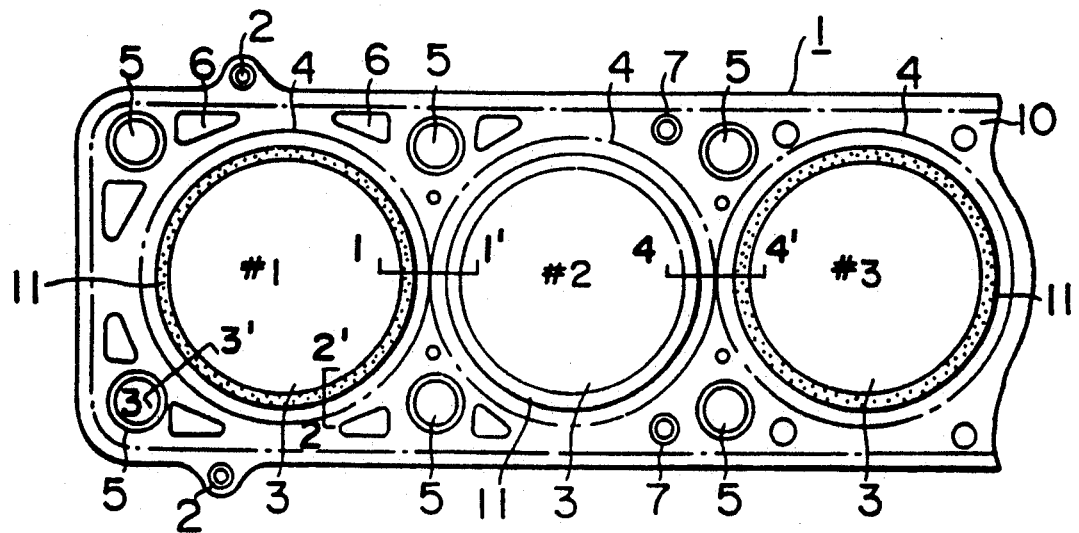
FIG. 2 is a schematic plan view, partly cut-away, of that metallic gasket, FIG. 3 provides an illustration of how the metallic gasket operates.

FIGS. 1(a)–1(c) are section views illustrative of one embodiment of the metallic gasket according to this invention, and FIG. 2 is a schematic plan view, partly cutaway, of the metallic gasket wherein the sections along the lines 1-1', 2-2' and 3-3' are shown in FIGS. 1(a), 1(b) and 1(c), respectively.

Referring first to the general plan arrangement shown in FIG. 2, a metallic gasket body, shown at 1, includes a base plate 10 made of an elastic material. These plates are formed, for example, of steel having elasticity, such as stainless steel corresponding to Japanese Industrial Standard (JIS) SUS 301 or SUS 304 which respectively correspond to American Standard (AISI) 301 or 304, and can have a thickness of, for example, 0.20–0.30 mm. The plate 10 has openings 3 located in association with combustion chamber bores, each of which is provided at its outer edge with a concentric array of beads 4.

Reference numeral 5 is a bolt hole through which a bolt or screw is inserted to fix the metallic gasket in place when it is built in an engine, 6 a hole through which cooling water circulates, and 7 an oil hole. Elements forming the metallic gasket are made integral by fixing means 2. It is noted that reference numeral 11 stands for a position at which a stopper is to be located.

Referring then to FIGS. 1(a)–1(c) there is a sectional view of the metallic gasket. In FIGS. 1(a)–1(c) the same parts as in FIG. 2 are indicated by the same reference numerals.

As illustrated in FIG. 1(a), the gasket body includes two base plates 10-1 and 10-2 formed of an elastic material, which are laminated together. The first base plate 10-1 is provided with a stepped bead 16-1. A stopper 11-1 is located at only an opening located corresponding to any one of odd-numbered cylinders #1, #3, .... The stopper may be formed of any known material and fixed in place by any known means such as thermal spraying. For example, the stopper can be a flat plate of stainless steel corresponding to JIS SUS 304. Alternatively, the stopper can be formed by thermal spraying an alloy comprised of, by weight, 18% nickel, 64% copper and 18% zinc. The stopper generally has a thickness of 0.05 to 0.15 mm. Referring to the geometry of the stepped bead, the length $l_1$ of one flat upper segment, on which the stopper 11-1 is to be located, preferably accounts for 30% to 40% inclusive of the full length l between the adjacent bores. It is then required that $l_1 > l_2$ wherein $l_2$ is the length of another flat upper segment on which no stopper is to be located.

The second base plate 10-2, on the other hand, is located below, or laminated on the lower side of, the first base plate 10-1 and, contrary to the first base plate 1, is provided with an outward stopper 11-2 for only an opening located corresponding to any one of even-numbered cylinders #2, #4, .... The second base plate 10-2 is otherwise similar to the first base plate 10-1.

In other words, the first base plate 10-1 is provided with the stopper only for the cylinder #1 but is not for the cylinder #2, while the second base plate 10-2 is provided with the stopper only for the cylinder #2. However, if the two base plates remain laminated together, then the stopper 11-1 for the cylinder #1 and the stopper 11-2 for the cylinder #2 would act synergistically to produce an effect similar to that achieved with a stopper located between both the cylinders.

As understood from the foregoing, the two base plates 10-1 and 10-2 each including an array of stepped beads are antisymmetrically located between the adjacent cylinders.

Consequently, when the two base plates are in a laminated state, the stepped beads engage each other through bends 17-1 and 17-2 on the middle portions of their associated slopes. In other words, the bend 17-1 of the bead of the first base plate engages centrally the slope (or incline) of the second base plate 10-2, while the bend 17-2 of the bead of the second base plate engages centrally the slope (or incline) of the first base plate 10-1.

Accordingly, when the metallic gasket is clamped in place, a deformation stress taking place at the bends adds to the spring stress of the stepped beads, resulting in a further increase in the spring constant. This in turn makes it possible to apply a pressure higher than a combined spring stress of the first and second base plates. To put it another way, the pressure increase is obtained by a two-stage spring action.

In an arrangement located between bolts as shown in FIG. 1(b), the length $W_1$ of the slope of each stepped bead is made shorter than $W_2$ in an arrangement located at a bolt position as shown in FIG. 1(c), thereby increasing the spring constant. This is because at a location between the bolted positions (2-2') the gasket is clamped in place with a less clamping force. In order to make up for such a less clamping force, $W_1$ should be made shorter so as to increase the spring constant. At the bolted position (3-3'), on the other hand, the gasket is clamped in place with a clamping force so large that the spring constant can remain reduced. In the arrangement shown in FIG. 1(b) or 1(c), the bend of each bead of one base plate engages centrally the slope of each bead of the associated base plate, as in the arrangement shown in FIG. 1(c).

Figure 3:
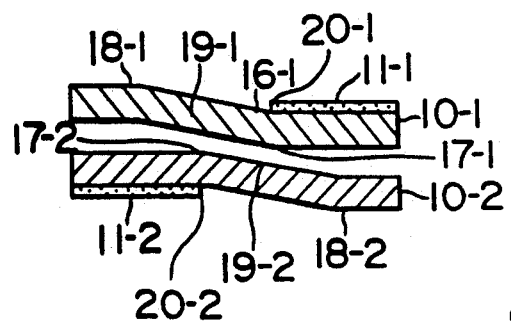

FIG. 3 is a sectional view taken along the line 4-4' of FIG. 2, providing an illustration of how the metallic gasket operates. In other words, FIG. 3 is a view illustrating an arrangement between the cylinders #2 and #3 as counted from the left. Thus, the stopper 11-1 provided on the first base plate 10-1 is located on its right-handed flat segment (in association with the cylinder #3), while the stopper 11-2 provided on the second base plate 10-2 is located on the its left-handed flat segment (in association with the cylinder #2).

As the metallic gasket is clamped in place by means of clamping bolts (not shown), it first engages the engine at the bends 18-1 and 18-2 of the first and second base plates 10-1 and 10-2 and the right- and left-handed portions of the stoppers 11-1 and 11-2, respectively. Then, the slopes 19-1 and 19-2 of the first and second base plates 10-1 and 10-2 come into simultaneous contact with the bends 10-2 and 17-1 of the second and first base plates 10-2 and 10-1, respectively. As the clamping force is further increased in this state, the stoppers 11-1 and 11-2 located at the ends of the first and second base plates close to the combustion chamber come into flat contact with the engine. As a result, only slight gaps are left at the ends 20-1 and 20-2 of the stoppers 11-1 and 11-2 located halfway between the associated cylinders.

Thus, the resulting spring stress is the sum of the initial spring constant attained by the stepped beads and the spring constant obtained incidental to the engagement of the slopes with the bends in the course of deformation. In other words, more increased pressures are applied across the bends 18-1 and 17-2 and the bends 18-2 and 17-1. At the ends 20-1 and 20-2 in particular, an additional stress attained by the engagement of the slopes with the bends 17-1 and 17-2 adds to the initial single spring stress of the stepped beads, resulting in a further increase in the pressure applied to the metallic gasket.

Figure 4:
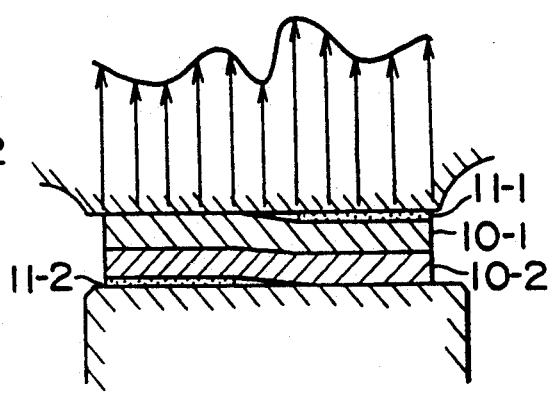
FIG. 4 is a view illustrating pressures acting on parts of the metallic gasket, when it is built in an engine and bolted in place.
Figure 5:
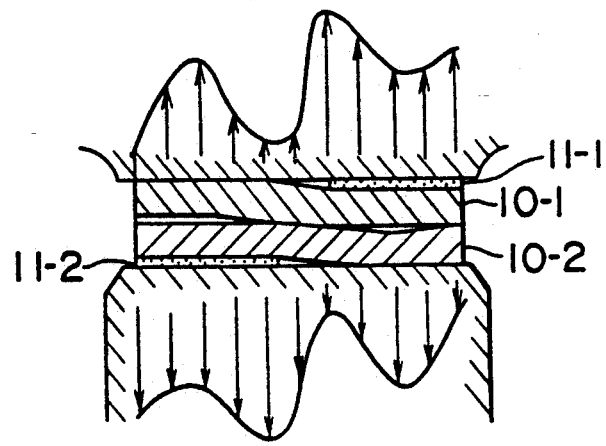
FIG. 5 is a view illustrating pressures acting on parts of the metallic gasket during thermal deformation, when an engine with the metallic gasket built in it is in operation.

FIG. 4 shows pressures applied to parts of the metallic gasket at the time of assembly, with the magnitude of pressures as ordinate. In connection with FIG. 4, it is noted that combustion chamber bores are positioned on both sides of the illustrated arrangement, with the outermost ends of the stoppers receiving increased pressures FIG. 5 illustrates pressures applied to parts of the metallic gasket at the time of thermal deformation, showing that pressures applied to the outermost ends of the stoppers increase symmetrically.

While the foregoing embodiment has been described with reference to using only two base plates, it should be understood that the present invention is not limited thereto. For instance, an auxiliary plate may be sandwiched between two main base plates.

Figure 6:
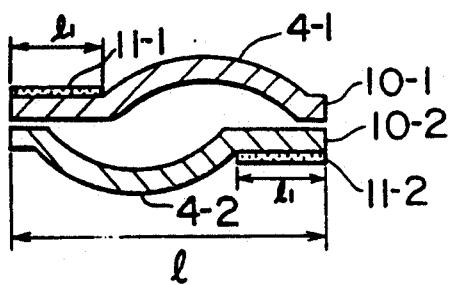
FIG. 6 is a sectional view taken along the line 1—1' in FIG. 2, showing another embodiment of the metallic gasket according to this invention.

FIG. 6 illustrates another embodiment of the metallic gasket according to this invention, wherein angular or arched beads are used.

Basically, this gasket is constructed from two or upper and lower base plates 10-1 and 10-2. The first base plate 10-1 is provided with an arched bead 4-1 at a location displaced from the center of the width 1 between cylinders toward the right-handed end or an odd-numbered cylinder, leaving a flat segment, on which a stopper 11-1 is then positioned. The second base plate 10-2, on the other hand, is provided with an arched bead 4-2 at a location displaced from the width 1 between cylinders toward the left-handed end or an even-numbered cylinder, leaving a flat segment, on which a stopper 11-1 is then positioned. Thus, the stoppers are alternately located on the upper and lower base plates 10-1 and 10-2, as is the case with the first embodiment.

More specifically, each or the bead 4-1 of the base plate 10-1 is provided on the outer edge of the cylinder #1 and is displaced somewhat toward the cylinder #2, rather than located at the center of the width 1 between the adjacent cylinders. In consequence, a relatively large flat segment $l_1$ is defined on the left side of the width 1 between the adjacent cylinders, thus forming a location on which the stopper 11-1 is to be positioned.

Each or the bead 4-2 of the base plate 10-2, on the other hand, is provided on the outer edge of the cylinder #2 and, contrary to the bead 4-1, is displaced toward the cylinder #1. Consequently, a flat segment $l_1$ is defined on the right side of the width 1 between the adjacent cylinders, forming a location on which the stopper 11-2 is to be positioned.

Thus, the base plates 10-1 and 10-2 are laminated together such that they are antisymmetrical in regard of the bead locations.

In the thus formed metallic gasket arrangement, the arched beads are displaced with respect to each other in a limited space between the adjacent cylinders, enabling flat segments to be defined on the opposite sides.

It is well-known that beads having a width less than 2 mm decrease in their capability to follow deformation. In a conventional arrangement, therefore, the length between the adjacent cylinders should be at least 5 mm in order to leave stopper spaces, each of 1.5 mm in width, at both ends of the bead. According to the second embodiment of the arrangement wherein the beads are displaced toward each other in an opposite direction to define flat segments on the opposite sides on which stoppers are to be positioned, however, it is possible to ensure sufficient stopper spaces of 1.5 mm or more in width.

Figure 7:
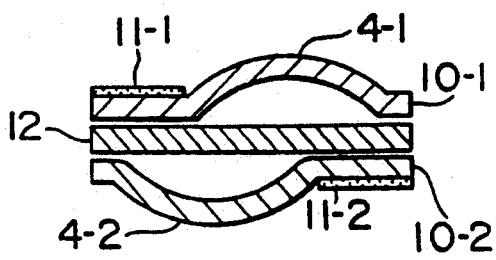
FIG. 7 is a sectional view taken along the line 1—1' in FIG. 2, showing a further embodiment of the metallic gasket according to this invention.

FIG. 7 illustrates a further embodiment of the metallic gasket according to this invention.

In FIG. 7, the same parts as in FIG. 6 are indicated by the same reference numerals and so will be not explained.

In the third embodiment, an auxiliary plate 12 is sandwiched between base plates 10-1 and 10-2, each having an arched bead on its outside. The auxiliary plate 12 can be formed of a steel, such as JIS SUS 304 or SPC which respectively correspond to American Standard (AISI) 304 or A 109-83, and generally has a thickness of 0.3 to 1.5 mm.

Obviously, this embodiment is applicable to an engine including a close array of cylinders to ensure stopper spaces of sufficient width.

Figure 8:
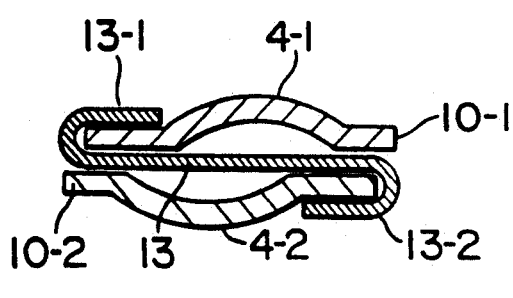
FIG. 8 is a sectional view taken along the line 1-1' in FIG. 2, showing a still further embodiment of the metallic gasket according to this invention.

FIG. 8 is a still further embodiment of the metallic gasket according to this invention.

In the forth embodiment, a shim plate 13 is inserted between the base plates 10-1 and 10-2 and is folded up and down at its ends to form folds 13-1 and 13-2 serving as stoppers. The shim plate can be formed of a steel, such as JIS SUS 301 or 304, and generally has a thickness of 0.08 to 0.15 mm.

Even with this embodiment, stopper locations of sufficient width are achievable, as is the case with the foregoing embodiments.

Figure 9:
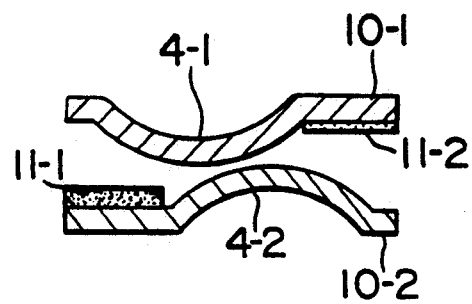
FIG. 9 is a sectional view taken along the line 1-1' in FIG. 2, showing a still further embodiment of the metallic gasket according to this invention.

FIG. 9 is a still further embodiment of the metallic gasket according to this invention.

In the fifth embodiment, the apices of arched beads 4-1 and 4-2 are displaced from each other, while they are located opposite to each other, forming diagonally flat segments on the insides of base plates, on which stoppers 11-1 and 11-2 are formed. This embodiment also shows that one of the stoppers (i.e., 11-1) can have a thickness different than that of the other stopper (i.e., 11-2). This arrangement can be used in the other embodiments of the present invention.

According to this embodiment, not only are stopper locations ensured, but also a more increased pressure is obtained on the metallic gasket between cylinders. This is because one bead engages another or the associated bead at their apices, thereby increasing the spring constant at the bead locations.

Figure 10A:
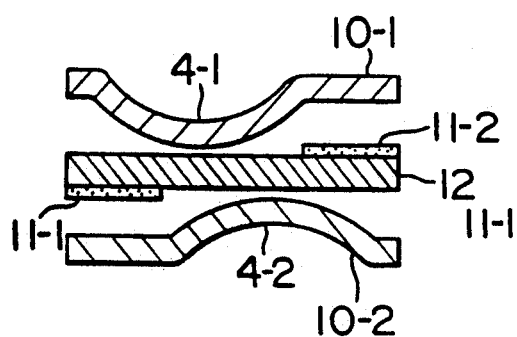
FIGS. 10(a) and 10(b) illustrate a still further embodiment of the metallic gasket according to this invention, FIG. 10(a) being a sectional view taken along the line 1-1' in FIG. 2 and FIG. 10(b) a sectional view taken along the line 2-2' in FIG. 2.
Figure 10B:
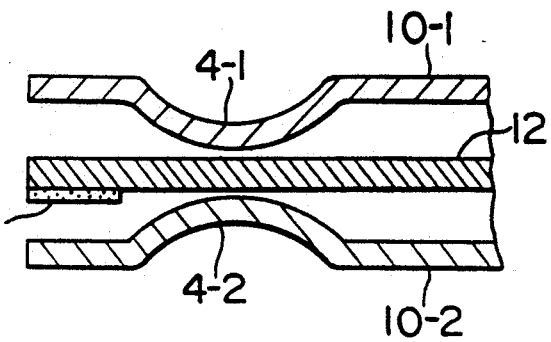
Figure 11:
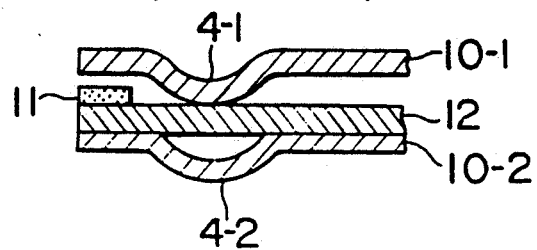
FIG. 11 is a view illustrative of a conventional metallic gasket.

FIGS. 10(a) and 10(b) are a still further embodiment of the metallic gasket according to this invention, FIG. 10(a) being a sectional view taken along the line 1-1' of FIG. 2 and FIG. 10(b) a sectional view taken along the line 2-2' of FIG. 2.

In the sixth embodiment, an auxiliary plate 12 is sandwiched between base plates 10-1 and 10-2, each having an arched bead 4-1 or 4-2 on its inside. Stoppers 11-1 and 11-2 are then provided on the auxiliary plate 12.

Even with this embodiment, effects similar to those already mentioned are achievable.

The above six embodiments have set forth representative materials for making the stoppers. It should be understood, however, that the stoppers can be formed by any materials, such as by the thermal spraying or plating of metals, made of flat metal materials or molded of metal materials, having sufficient size or thickness for compensating for the varying distances between the various plates of the gasket of the present invention, or for compensating for the varying distances between the gasket of the present invention and the cylinder block and cylinder head of an internal combustion engine. If desired, an additional sealing effect can be obtained by applying a sealing agent between the stopper an the base plate, auxiliary plate, etc. The sealing agent can be a silicone rubber, a fluorocarbon rubber, or a synthetic rubber, such as nitrile rubber.

According to the present invention as detailed above, an array of beads are provided on each of two base plates which are antisymmetrically laminated together. One base plate is provided with an array of beads in association with an odd-numbered combustion chamber bore and the other base plate is provided with an array of beads in association with an even-numbered combustion chamber bore, while stoppers are located on the outside of the laminate. Thus, it is possible to provide a metallic gasket of a simplified structure, which can successfully be used with engines, whether of small size or of high performance.

What is claim is:

1. A metallic gasket including a base plate which is made of an elastic metal plate and provided with an array of beads at its peripheral edge located in association with a combustion chamber bore, wherein:

said base plate is divided into two parts, each of which is provided with an array of stepped beads, first stoppers are located on flat segments of a first array of stepped beads on the first base plate part, said flat segments being positioned in association with an odd-numbered cylinder, while second stoppers are located on flat segments of a second array of stepped beads on the second base plate part, said flat segments being positioned in association with an even-numbered cylinder, and said first and second base plate parts are laminated together with said first and second respective beads of said first and second base plate parts offset from each other.

2. A metallic gasket as claimed in claim 1, wherein when said base plate parts are laminated together, the bends of the respective stepped beads engage the centers of slopes of the associated beads.

3. A metallic gasket as claimed in claim 1, wherein the length $l_1$ of said flat segments to be provided with said stoppers accounts for 30% to 40% of the full length $l$ between the adjacent combustion chamber bores.

4. A metallic gasket as claimed in claim 3, wherein $l_1 > l_2$ wherein $l_1$ is the length of the flat segments on which said stoppers are located and $l_2$ is the length of flat segments on which no stoppers are located.

5. a metallic gasket including two base plates made of an elastic metal, each of which is provided with an array of arched beads at a peripheral edge of an associated combustion chamber bore, wherein:

said arched beads provided on the first base plate in association with an odd-numbered cylinder are displaced from the widthwise center between the adjacent cylinders in a predetermined direction to form flat segments on which stoppers are to be located, said arched beads provided on the second base plate in association with an even-numbered cylinder are displaced from the widthwise center between the adjacent cylinder in the direction counter to the first-mentioned direction to form flat segments on which stoppers are to be located, and said first and second base plates are laminated together with said respective beads of said first and second base plates offset from each other.

6. A metallic gasket as claimed in claim 1, wherein said stoppers are formed by folding up and down a shim plate sandwiched between said first and second base plates.

7. A metallic gasket as claimed in claim 5, wherein said stoppers are located on the upper and lower portions of both ends of an auxiliary plate sandwiched between said first and second base plates.

8. A metallic gasket as claimed in claim 6, wherein said stoppers vary in thickness with respect to each other.

9. A metallic gasket as claimed in claim 2, wherein the length $l_1$ of said flat segments to be provided with said stoppers account for 30% to 40% of the full length $l$ spaced between the adjacent combustion chamber bores.

10. A metallic gasket as claimed in claim 7, wherein said stopper varying in thickness with respect to each other.

11. A metallic gasket comprising first and second elastic metal base plates, each said base plate having a plurality of openings corresponding to combustion chamber bores, said first base plate having an array of beads adjacent even-number cylinders and flat segments adjacent odd-number cylinders.

said second base plate having an array of beads adjacent odd-number cylinders and flat segments adjacent even-number cylinders, stoppers covering at least a portion of said flat segments, and said first and second base plates being laminated together with said respective beads of said first and second base plates offset from each other.

* * * * *